(12) United States Patent
Uchiike et al.

(10) Patent No.: US 8,926,112 B2
(45) Date of Patent: Jan. 6, 2015

(54) BACKLIGHT DEVICE AND DISPLAY APPARATUS

(75) Inventors: Hiroshi Uchiike, Fujisawa (JP); Masanao Kurita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/443,210

(22) Filed: Apr. 10, 2012

(65) Prior Publication Data

US 2012/0287667 A1    Nov. 15, 2012

(30) Foreign Application Priority Data

May 9, 2011    (JP) ................. 2011-104550

(51) Int. Cl.
| | |
|---|---|
| *G09F 13/04* | (2006.01) |
| *G09F 13/08* | (2006.01) |
| *F21V 8/00* | (2006.01) |
| *G02F 1/1335* | (2006.01) |

(52) U.S. Cl.
CPC .............. *G02B 6/0068* (2013.01); *G02B 6/008* (2013.01); *G02F 1/133615* (2013.01)
USPC .......... 362/97.1; 362/606; 362/608; 362/613; 362/616; 362/617; 349/58; 349/61; 349/62

(58) Field of Classification Search
CPC .... G02B 6/0018; G02B 6/0078; G02B 6/008; G02B 6/0068; G02B 6/0046; G02B 6/0088; G02B 6/0021; G02B 6/0085; G02B 6/0028; G02B 6/0076; G02F 1/133615; G02F 1/133603; G02F 1/133611; G02F 1/1336; G02F 1/133608

USPC ......... 362/84, 97.1, 97.2, 235, 257, 602, 606, 362/607, 613, 616, 617; 349/56, 58, 61, 62, 349/65, 66

See application file for complete search history.

(56) References Cited

U.S. PATENT DOCUMENTS

| | | | | |
|---|---|---|---|---|
| 2004/0240230 | A1* | 12/2004 | Kitajima et al. | 362/558 |
| 2005/0128374 | A1* | 6/2005 | Furukawa | 349/56 |
| 2008/0037284 | A1* | 2/2008 | Rudisill | 362/629 |
| 2008/0231774 | A1* | 9/2008 | Tomita et al. | 349/66 |
| 2010/0134718 | A1* | 6/2010 | Ajichi et al. | 349/62 |
| 2010/0214802 | A1* | 8/2010 | Masuda et al. | 362/606 |
| 2010/0225572 | A1* | 9/2010 | Suminoe et al. | 345/102 |
| 2010/0271806 | A1* | 10/2010 | Bae et al. | 362/97.1 |
| 2010/0296026 | A1* | 11/2010 | Kubota et al. | 349/62 |
| 2010/0302805 | A1* | 12/2010 | Jeong et al. | 362/612 |
| 2011/0128469 | A1* | 6/2011 | Wang | 349/62 |
| 2011/0157491 | A1* | 6/2011 | Shimizu | 348/790 |

FOREIGN PATENT DOCUMENTS

| | | |
|---|---|---|
| JP | 2003-272423 | 9/2003 |
| JP | 4021340 | 12/2007 |

* cited by examiner

*Primary Examiner* — Anh Mai
*Assistant Examiner* — Kevin Quarterman
(74) *Attorney, Agent, or Firm* — Cowan, Liebowitz & Latman, P.C.

(57) ABSTRACT

The backlight device is configured in a planar geometry by the combination of a plurality of light emitting units. The light guide plate of the light emitting unit has a light guide unit that guides light from the light source and a light emission surface that emits light from the light guide unit. Adjacent light emitting units are arranged to cross to each other and the light emission surface of a light emitting unit overlaps with the light guide unit of another light emitting unit such that the light guide unit of each light guide plate of the light emitting unit does not extend outside the light emission region of the backlight device.

10 Claims, 11 Drawing Sheets

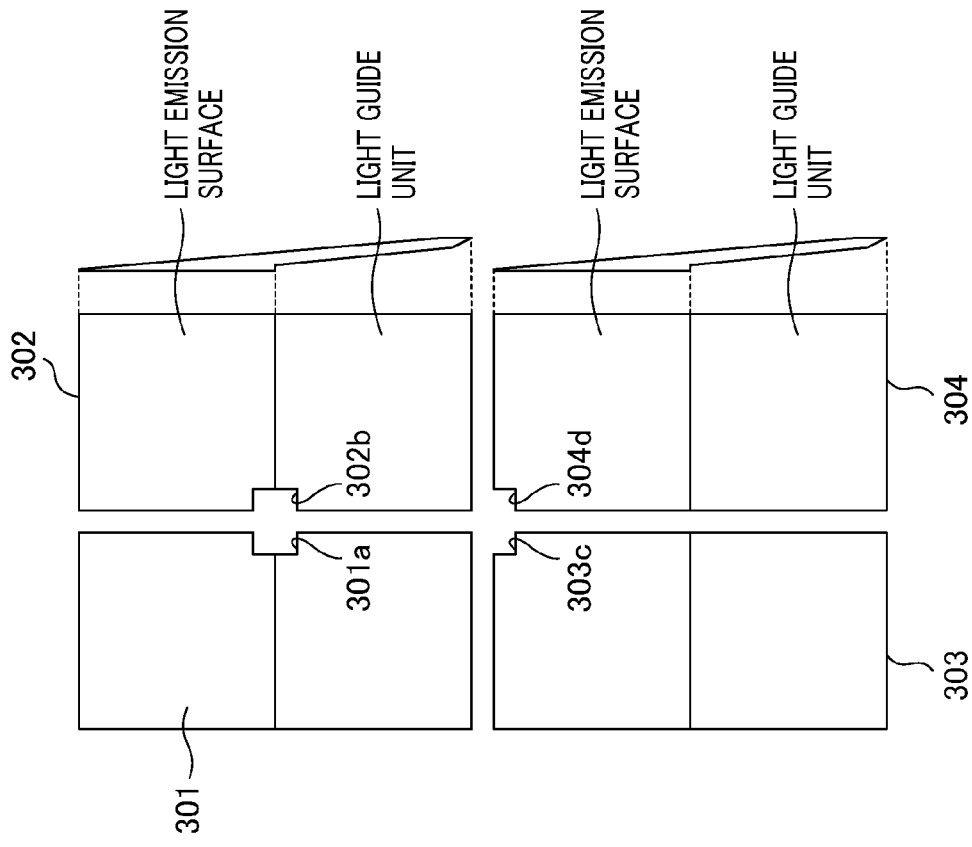
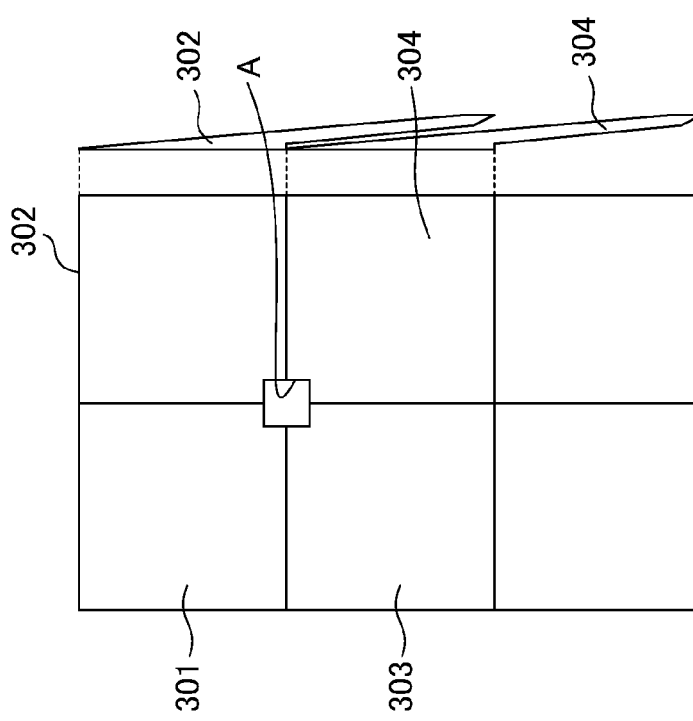

204 : POSITIONAL RELATIONSHIP BETWEEN LEDS
201 : ORTHOGONAL COMBINATION OF FOUR LIGHT EMITTING UNITS (COUNTERCLOCKWISE ARRANGEMENT)
202 : ORTHOGONAL COMBINATION OF FOUR LIGHT EMITTING UNITS (CLOCKWISE ARRANGEMENT)

203 : POSITIONAL RELATIONSHIP BETWEEN LEDS

201 : ORTHOGONAL COMBINATION OF FOUR LIGHT EMITTING UNITS (COUNTERCLOCKWISE ARRANGEMENT)

BACKLIGHT DEVICE AND DISPLAY APPARATUS

BACKGROUND OF THE INVENTION

1. Field of the Invention

The present invention relates to a technique for configuring a backlight device by combining a plurality of light guide plates.

2. Description of the Related Art

In order to reduce the thickness of a backlight of a liquid crystal display apparatus, a technology for forming an illumination unit by arranging a plurality of light emitting units each having a light source and a small light guide plate is known. Japanese Patent Laid-Open No. 2003-272423 discloses an illumination device that includes a plurality of units each having a light source and a light guide plate. The light guide plate has a light emission surface that emits light reflected from a reflection surface and a light guide unit that guides the light entered into the light guide plate to the light emission surface. For reducing the thickness of a backlight, units are obliquely stacked to each other such that the side surface of the light guide plate is adjacent to the reflection surface. With this arrangement, a portion near the light source (light guide unit) is always positioned at the end of the backlight. Consequently, the portion undesirably extends outside the light emission region of a backlight device consisting of a plurality of light emission surfaces. Thus, the width of at least one side of the screen outer frame (frame section) needs to be expanded.

In the conventional configuration as described above, the light guide unit of the light guide plate extends outside at least one side of the light emission region of the backlight device consisting of a plurality of light emission surfaces, and thus, the width of the outer frame of the display apparatus is expanded. This may result in restriction in designing the display apparatus.

Accordingly, the present invention provides a backlight device in which a plurality of light emitting units each having a light source and a light guide plate is arranged such that the light guide units of light guide plates do not extend outside the light emission region of the backlight device.

SUMMARY OF THE INVENTION

According to an aspect of the present invention, a backlight device in which a plurality of light emitting units each having a light source and a light guide plate is combined is provided, wherein the light guide plate has a light guide unit that guides light from the light source and a light emission surface that emits light from the light guide unit, and the light guide unit of the light guide plate constituting a first light emitting unit overlaps with the light emission surface of the light guide plate constituting a second light emitting unit which is arranged to cross the first light emitting unit as viewed from the direction perpendicular to the light emission surface of the light guide plate.

According to the present invention, light emitting units may be arranged such that the light guide units of light guide plates do not extend outside the light emission region of the backlight device as viewed from the direction perpendicular to the light emission surface of the light guide plate.

Further features of the present invention will become apparent from the following description of exemplary embodiments with reference to the attached drawings.

BRIEF DESCRIPTION OF THE DRAWINGS

FIG. 7A is a front view illustrating an example of the configuration of a rectangular hole portion formed at the boundaries of the light emission surfaces of a plurality of light emitting units.

FIG. 7B is a front view and a side view illustrating light guide plates.

DESCRIPTION OF THE EMBODIMENTS

Preferred embodiments of the present invention will be described with reference to the attached drawings. A display apparatus to be described below includes a backlight device that is arranged below a display unit for displaying an image using a liquid crystal display panel or the like.

First Embodiment

Figure 1:
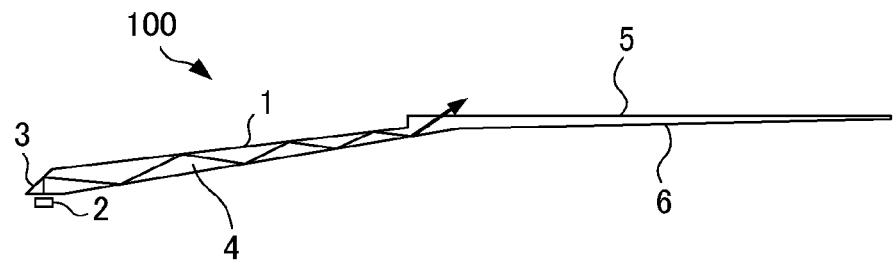
FIG. 1 is a cross-sectional view illustrating an example of the configuration of a light emitting unit according to a first embodiment of the present invention in conjunction with FIGS. 2 to 4.

For explaining the backlight device of the present embodiment, a description will be first given of the configuration of a light emitting unit. FIG. 1 is a cross-sectional view illustrating an example of the configuration of a light emitting unit 100. A plurality of light-emitting diodes (hereinafter referred to as "LED") 2 are arranged as light sources under the left hand end of a light guide plate 1. Although the plurality of LEDs 2 is provided along the direction perpendicular to the plane of the drawing sheet of FIG. 1, only one LED 2 is shown in FIG. 1. An LED group is constituted only by white color LEDs or is constituted by the combination of LEDs of different light emission colors (for example, red (R), green (G), blue (B), or the like). A reflection surface 3 is formed on the light guide plate 1 to prevent light leaks from the LED 2. For forming the reflection surface 3, a method for attaching a reflection sheet to the end surface of the light guide plate 1 or a method for forming a reflection surface by vapor-depositing a metal such as silver on the end surface thereof may be employed. In this embodiment, the reflection surface 3 is formed by the latter method.

Light emitted from the LED 2 and reflected by the reflection surface 3 is repeatedly reflected within a light guide unit 4 of the light guide plate 1. Then, light guided to the distal end of the light guide unit 4 exits to the outside through a light emission surface 5. The thickness of a portion having the light emission surface 5 is gradually reduced with increasing distance from the light guide unit 4. In order to uniform a light-emission distribution over the light emission surface 5, a diffusive reflecting structure needs to be provided on the lower surface of the light emission surface 5. The diffusive reflecting structure may be obtained by a method for attaching a reflection plate, a method for printing a white dot, a method for providing a diffraction grating, or the like. In this embodiment, a diffusing/reflecting surface 6 formed by a white dot is printed on the lower surface of the light emission surface 5. Since the LED 2 is a point light source, light reflection/diffusion needs to be repeated over a certain distance in order to obtain a uniform light emission. For this purpose, the light guide plate 1 is separated into the light guide unit 4 and the portion having the light emission surface 5 so as to ensure a distance required for reflection and diffusion. When only white color LEDs are used, irregularity in luminance occurs in the light guide unit 4. On the other hand, when LEDs of different light emission colors are used in combination, irregularity in luminance and color occurs in the light guide unit 4. Thus, the light guide unit 4 needs to overlap with (be covered by) the light emission surface 5 of another light emitting unit 100 such that the light guide unit 4 does not emerge on the display surface side.

Next, a description will be given of a method for arranging a plurality of light emitting units 100 in combination.

Figure 2:
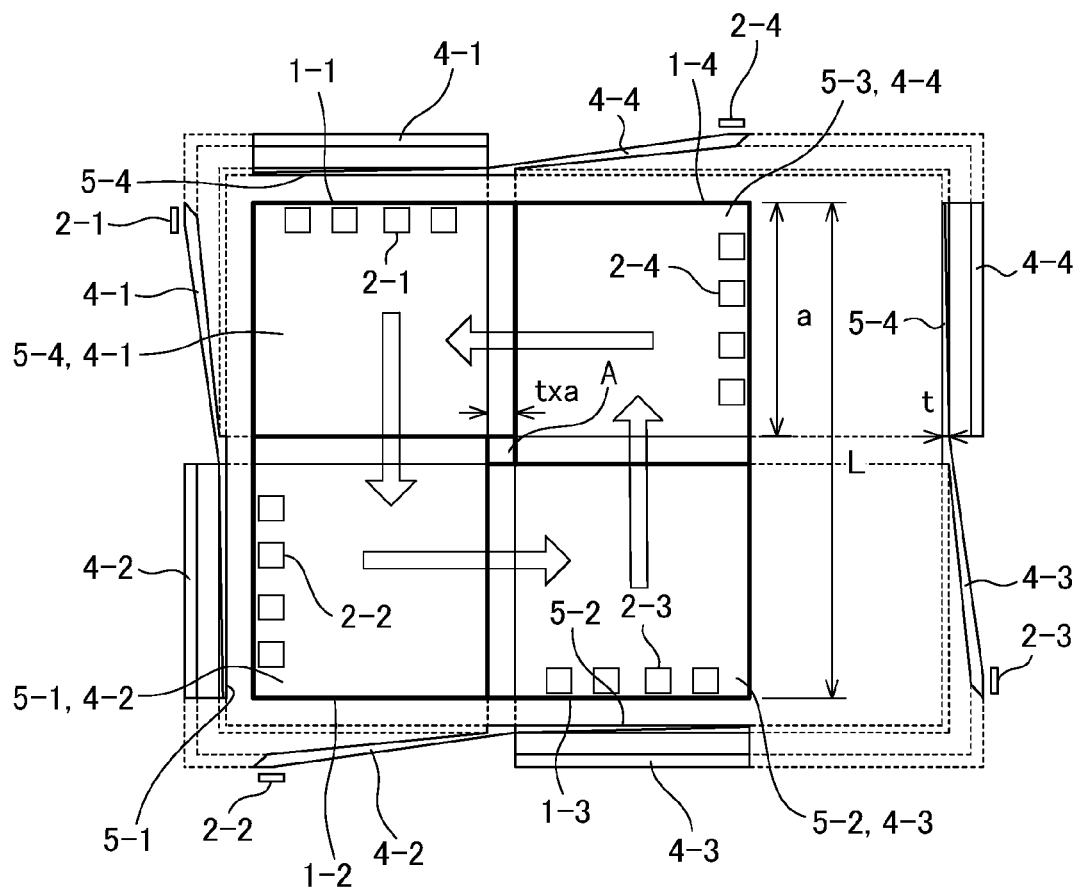
FIG. 2 is a view illustrating an assembly in which four light emitting units are combined.
Figure 3:
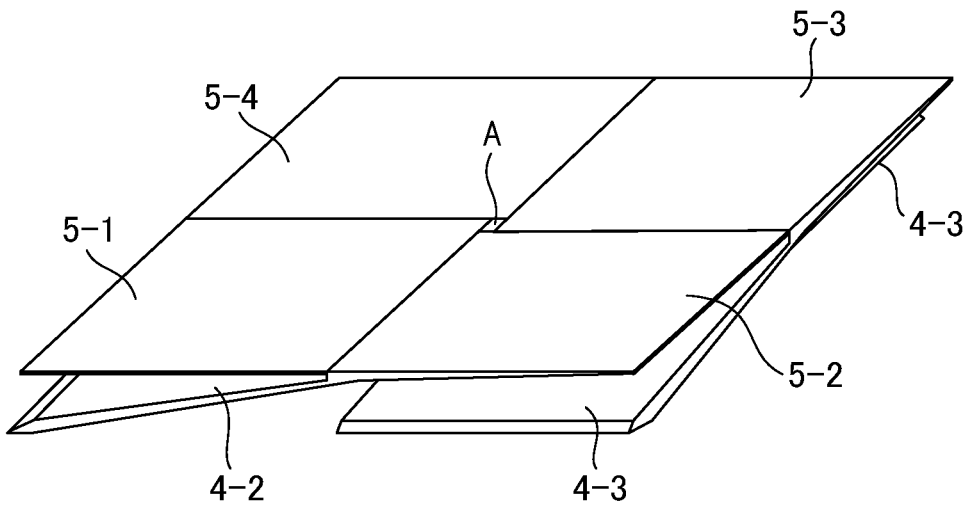
FIG. 3 is a perspective view illustrating the assembly shown in FIG. 2.

When the plurality of light emitting units 100 is arranged in a simple linear manner such that the light guide unit 4 overlaps with the portion having the light emission surface 5, the light guide unit 4 of the light emitting unit 100 positioned at the end of the plurality of light emitting units 100 remains to be unhidden. In order to avoid such a disadvantage, in the present embodiment, a first light emitting unit is arranged to cross a second light emitting unit as shown in FIG. 2 and FIG. 3. Hence, the light guide unit of the light guide plate constituting the first light emitting unit overlaps with the light emission surface of the light guide plate constituting the second light emitting unit. In this embodiment, an assembly in which the four light emitting units 100 are combined in directions orthogonal to each other is shown. FIG. 2 is a front view illustrating an assembly consisting of light emitting units as viewed from the light emission surface side of the light emitting unit and a side view illustrating an assembly consisting of light emitting units as viewed from the side thereof. FIG. 3 is a perspective view illustrating the assembly shown in FIG. 2.

When a natural number variable "N" is in a range from 1 to 4, a light guide plate 1-N constituting the Nth light emitting unit has a light guide unit 4-N and a light emission surface 5-N. The light guide plate 1-N and an LED 2-N constitute the Nth light emitting unit. Hereinafter, a description will be given of the positional relationship between the light guide plates 1-N based on the assumption that the above is a display surface side where light is emitted from the light emission surface 5-N of the light emitting unit and the below is a side where the LED 2-N is arranged.

The light emission surfaces and the light guide units are overlapped with each other in a staggered manner to thereby form four sides of a rectangular shape (return to N=1 when N+1=5) such that the next (N+1)th light guide unit 4-(N+1) overlaps with the Nth light emission surface 5-N. In other words, the positional relationship between the light emission surfaces 5-1 to 5-4 and the light guide units 4-1 to 4-4 is as follows:

|  | Above | Below |
|---|---|---|
| Upper left portion in FIG. 2 | 5-4 | 4-1 |
| Lower left portion in FIG. 2 | 5-1 | 4-2 |
| Lower right portion in FIG. 2 | 5-2 | 4-3 |
| Upper right portion in FIG. 2 | 5-3 | 4-4 |

Each of the arrows shown in FIG. 2 indicates the direction to which light emitted from the LEDs 2-1 to 2-4 is guided. In other words, light emitted from the LED 2-N is exit from the light emission surface 5-N through the light guide unit 4-N.

As described above, a plurality of light emitting units is arranged by being combined in directions orthogonal to each other, and thus, each of the light guide units 4-N overlaps with each of the light emission surfaces 5-M (note that M=N−1 and when M=0, M=4). The length of one side of a square configured by a group of light guide plates (in this case, the number of light guide plates is four) is "L" and the width of a light guide plate (the length of a narrow side as viewed from the top) is "a". For arranging a plurality of light guide plates so as to overlap with each other, the value of "L" is longer than twice "a" by the length of "txa" as shown in FIG. 2. The length "txa" represents a length of a portion where the light emission surface of a light guide plate does not overlap with another light guide plate and is a length several times longer than the thickness "t" (see FIG. 2) of a portion where a light guide plate overlaps with the end side of another light guide plate. Regarding the relationship between lengths of a light guide unit and a light emission surface as viewed from the front, the length of the light emission surface is longer than that of the light guide unit by the length "txa". When the length of a light guide unit is equal to that of a light emission surface (the length of a light guide plate in the longitudinal direction) as viewed from the top without such arrangement, a gap occurs between two adjacent light-guiding surfaces, and thus, a cross-shaped gap is generated at the center of the group of light guide plates. The gap is generated by the fact that a light guide unit does not overlap with the light emission surface of a light guide plate adjacent thereto, resulting in a reduction in luminance. Consequently, the existence of the gap increases the chances of making irregularity in luminance of a display surface. In the configuration shown in FIG. 2, the length of a light emission surface is longer than that of a light guide unit by the length "txa" such that a cross-shaped gap is prevented from being occurred. Even when some gap occurs, irregularity in luminance of the light emission surface of a light guide plate can be held within the allowable range using a method using an optical sheet such as a diffusion plate, a method for sufficiently spacing the distance between the light emission surface of a light guide plate and a display panel, or the like.

Next, a description will be given of the arrangement of a light detection unit.

When a backlight device is configured by arranging a plurality of light emitting units without any gap, there is no place for a light sensor for detecting the emitted light in the backlight device. Thus, a method for providing light sensors on light emitting units to detect conditions of light in light guide plates may be employed. However, in this method, the number of light sensors needs to be equal to the number of light emitting units, resulting in an increase in costs. What condition the emitted light is needs to be estimated from conditions of light in light guide plates, resulting in control errors. Hereinafter, a description will be given of the arrangement of light guide plates and a light sensor. With this arrangement, not only the light emitted from the light emission surfaces of the light guide plates can be detected but also the number of light sensors can be reduced without significantly affecting the luminance distribution on the screen.

Figure 4:
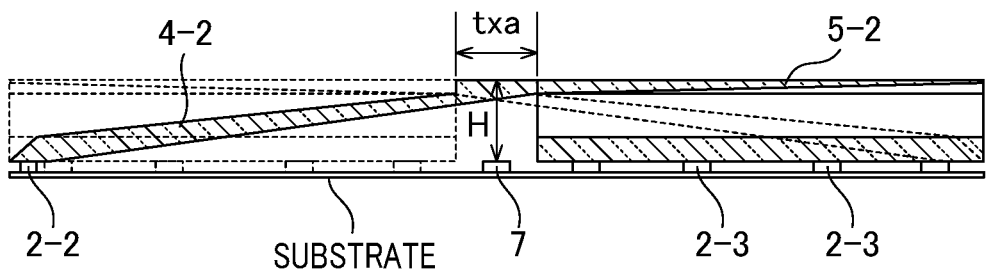
FIG. 4 is a cross-sectional view illustrating the assembly shown in FIG. 2.

FIG. 4 is a cross-sectional view illustrating the assembly shown in FIG. 2.

When four light guide plates are combined, a space A (see FIG. 2 and FIG. 3), i.e., a rectangular-shaped hole portion having the length of one side "txa", is generated as viewed from the front (direction perpendicular to the light emission surface of the light guide plate). A light sensor 7 is arranged on a substrate to detect light passed through the space A. In other words, the light which is emitted from the light emitting units and then reflected by diffusion plates or a LCD panel (not shown) disposed on the front surface of the backlight, reaches through the space A to the light sensor 7 for detection. It is preferable that the distance (hereinafter referred to as "H") from the light sensor 7 to the light emission surface of the light guide plates is the same as the length of one side "txa" according to the space A such that light emitted from the light emitting units is suitably detected by the light sensor 7. In order to satisfy the relationship, four light guide plates need to be combined by adjusting an area overlapped with the light guide plates, the angle of the light guide plate itself, or the like. In order to prevent light from an LED (for example, LED 2-3) disposed nearby from being directly detected by the light sensor 7, a light shielding wall (not shown) or the like is provided around the light sensor 7. The LEDs 2-1 to 2-4 belong to the same control block and are controlled by a control circuit (not shown) based on the detection signal from the light sensor 7.

All the assemblies of the light emitting units do not need to be configured as shown in FIG. 4 but only the configuration of the light guide plates at which a light sensor wishes to be arranged needs to be changed. With this arrangement, a setting can be made such that how many light sensors bear the entire screen, so that the number of light sensors can be reduced to the minimum necessary. In the example, the space A is provided between the assemblies in which a plurality of light emitting units is combined. Since light from the surrounding light emitting units also reaches a display surface positioned immediately above the space A, the occurrence of irregularity in luminance can be suppressed to the minimum. Since the light emission surfaces of the light emitting units have no more than a small gap with the length of one side designated by "txa", the occurrence of irregularity in luminance can be suppressed.

According to the first embodiment, the light guide units of the light guide plates and their light sources do not extend outside the light emission region of the backlight device even when the backlight device is configured by the combination of a plurality of light emitting units. Thus, the width of the outer frame on four sides of the display apparatus can be reduced, resulting in no restriction in designing the display apparatus.

Second Embodiment

Next, a description will be given of a second embodiment of the present invention. In the present embodiment, a description will be given taking an example in which light guide plates overlap with each other in the linear arrangement. Note that components corresponding to or similar to those in the first embodiment are designated by the same reference numerals, and therefore, its explanation will be omitted. When the types of light guide plates need to be distinguished from each other, an identification symbol (for example, character "A" representing Type A or the like) is added to the reference numeral already used. For other embodiments to be described below, components corresponding to or similar to those in the first embodiment are designated by the same reference numerals, and therefore, its explanation will be omitted.

Figure 5:
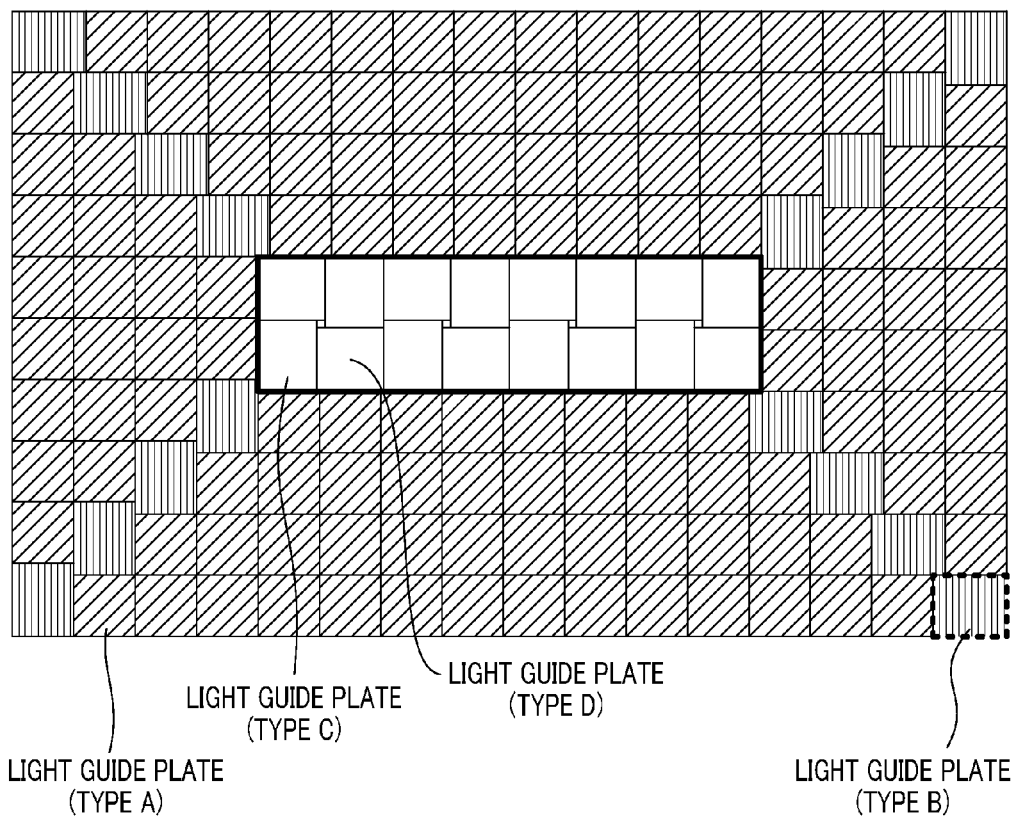
FIG. 5 is a front view illustrating an example of the entire surface of a combined plurality of light emitting units according to a second embodiment of the present invention in conjunction with FIGS. 6 to 8.

FIG. 5 is a front view illustrating an example of the arrangement structure of the light emitting units. In this embodiment, four types (Type A to Type D) of light guide plates are employed.

The Type-A light guide plates are arranged along a fixed direction, and the diagonally shaded portion shown in FIG. 5 represents the light emission surface of the Type-A light guide plate. The Type-A light guide plate is used when the light guide plates are arranged in an overlapped manner in a lateral direction from a lower left side (a horizontal direction or a long-side direction of a rectangular backlight). When the Type-A light guide plate reaches the end of the screen, for example, the right end thereof, the direction along which the light guide plates are arranged needs to be changed such that the light guide plates are orthogonal to each other (see the broken-line frame at the lower right side shown in FIG. 5). In other words, another light guide plate which is different from the Type A light guide plate needs to be used such that the light guide plates are overlapped so as to be orthogonal to each other at the ends of the screen. The Type-B light guide plate is a direction-changing light guide plate for changing an orientation of the arrangement of a light emitting unit, and the vertically shaded portion shown in FIG. 5 represents a Type-B light emission surface.

Figure 6:
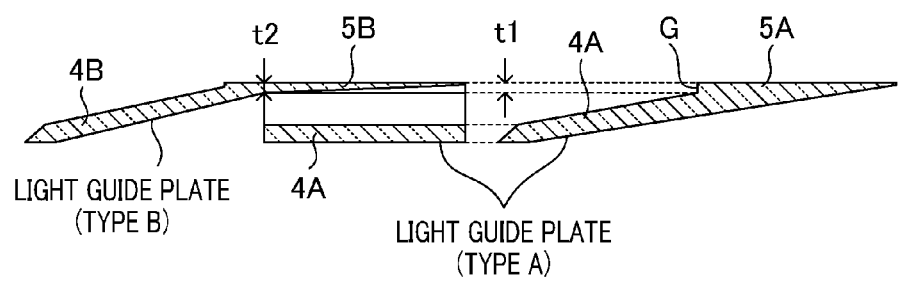
FIG. 6 is a cross-sectional view illustrating a crossing portion when a plurality of light emitting units is combined.

FIG. 6 shows a Type-A light guide plate and a Type-B light guide plate.

The Type-B light guide plate has a cross-section as in FIG. 1, t2 represents a thickness of a portion having a light emission surface 5B, and the thickness t2 narrows as the portion having the light emission surface 5B extends away from the light guide unit 4B. Also, the light guide unit 4A of the Type-A light guide plate is hidden beneath the light emission surface 5A. The light guide unit 4A and the lower surface of the light emission surface 5A are inclined surfaces, and t1 represents the height of a level difference section G between the light guide unit 4A and the portion having the light emission surface 5A. When the Type A and the Type-B light guide plates are orthogonal to each other as viewed from the front, one side of the light emission surface 5A (one side of the light guide plate in the lateral direction), at which the level difference G is formed, is adjacent to one side of the light guide plate of the light emission surface 5B in the longitudinal direction. The thickness "t2" of the portion having the light emission surface 5B satisfies the relationship of t2≤t1. In other words, the height "t1" of the level difference section G provided on the Type-A light guide plate is equal to or greater than the thickness of the portion having the light emission surface 5B in the Type-B light guide plate. As viewed from the front, the area of the Type-B light emission surface 5B is larger than the area of the Type-A light emission surface 5A.

After the direction along which the Type-A light guide plates are arranged is changed from the rightward direction to the upward direction as shown in FIG. 5 using the Type-B light guide plate, the Type-A light guide plates are again arranged so as to be overlapped with each other along the upper direction. When the Type-A light guide plate reaches the upper right end, the direction along which the Type-A light guide plates are arranged is changed from the upward direction to the leftward direction using the Type-B light guide plate. The light guide plates are continuously arranged using the same arrangement method, and thus, the light guide plate returns to the initial position (lower left corner) after one circulation around the four sides. When the same arrangement method is repeatedly applied to the inner peripheral direction, the range to which the arrangement method is not applicable is generated at the central portion. The range corresponds to the central portion shown by the thick line frame in FIG. 5. When the same arrangement method as that employed in the outer peripheral portion is employed in the range, an elongated slit gap may be provided at the central portion.

Accordingly, in the present embodiment, Type C and Type D light guide plates are used at the central portion such that light guide plates each constituted by a group of four light guide plates which are orthogonal to each other (see FIG. 2) are embedded without any gap as shown in the first embodiment. The central portion may be configured either by single type light guide plates or by multi-types of light guide plates depending on the size of the screen and the size of the light guide plates located on the outer periphery thereof. In this embodiment, two types of light guide plates are used. A Type-C light guide plate has the same shape as that of the Type-A light guide plate except that the width thereof, the area of the light emission surface and the light guide unit, or the like is changed. A Type-D light guide plate has a similar shape to that of the Type-B light guide plate. When the central portion is configured by the combination of squares, the central portion can be configured by single-type light guide plates. The present invention is not limited to the configuration in which the entire screen is covered by four types of light guide plates, but may also be the configuration in which the entire screen is covered only by the Type-B light guide plates arranged in one direction.

Next, a description will be given of the arrangement of a light detection unit when light emitting units are overlapped with each other along a fixed direction.

FIG. 7 shows an example of the arrangement of four light guide plates 301 to 304. FIG. 7A is a front view illustrating four light guide plates in the overlapped state and a side view thereof on its right side. FIG. 7B is a front view illustrating light guide plates and a side view illustrating the light guide plate 302 and the light guide plate 304 on its right side.

The space A is a rectangular hole formed by the notches of the light guide plates, and light passed through the space A is detected by a light sensor (not shown).

Notches 301a and 302b are formed in the central portion of one side in the longitudinal direction of the light guide plates 301 and 302, respectively, i.e., the boundary portion between light guide units and portions having light emission surfaces of light guide plates 301 and 302, respectively. The shapes of these light guide plates have inversion symmetry in the lateral direction. Also, notches 303c and 304d are formed in one ends in the longitudinal direction of the light guide plates 303 and 304, respectively. The shapes of these light guide plates also have inversion symmetry in the lateral direction.

Since the light guide unit of the light guide plate 301 is overlapped by the light emission surface of the light guide plate 303, the half of the notch 301a formed in the light guide plate 301 needs to be of the same shape as that of the notch 303c formed in the light guide plate 303. The same applies to the relationship between the light guide plate 302 and the light guide plate 304.

While, in this embodiment, notch is formed in each light guide plate so as to make the space A rectangular-shape through hole, the shape of a hole portion may be formed in a circular shape, a polygonal shape, or the like. Although the light sensor is arranged immediately below the space A, the present invention is not limited thereto. The light sensor may be arranged at any position at which light incident to the space A can be received.

As in the first embodiment (see FIG. 4), it is preferable that the length of one side of the space A is the same distance (height) as that from the light emission surface of light guide plates to the light sensor. Also, the space A may be provided only at a position corresponding to the location of the light sensor. A setting can be made such that the luminance and the color of the entire screen are adjusted by how many sensors, and thus, the number of light sensors can be reduced in minimum necessary.

Some gap between light guide plates can be made if the following two conditions are met.

(I) The height from the light emission surface of the light guide plate to the light sensor is substantially equal to the size of the space A (the length of one side thereof).

(II) Irregularity in luminance of the light emission surface of the light guide plate can be suppressed within an allowable range by using an optical sheet such as a diffusion plate or the like or by sufficiently spacing the light emission surface of the light guide plate from an LCD panel.

In order to hold the relationship (I), a cylindrical member may be arranged so as to surround a light sensor.

Figure 8:
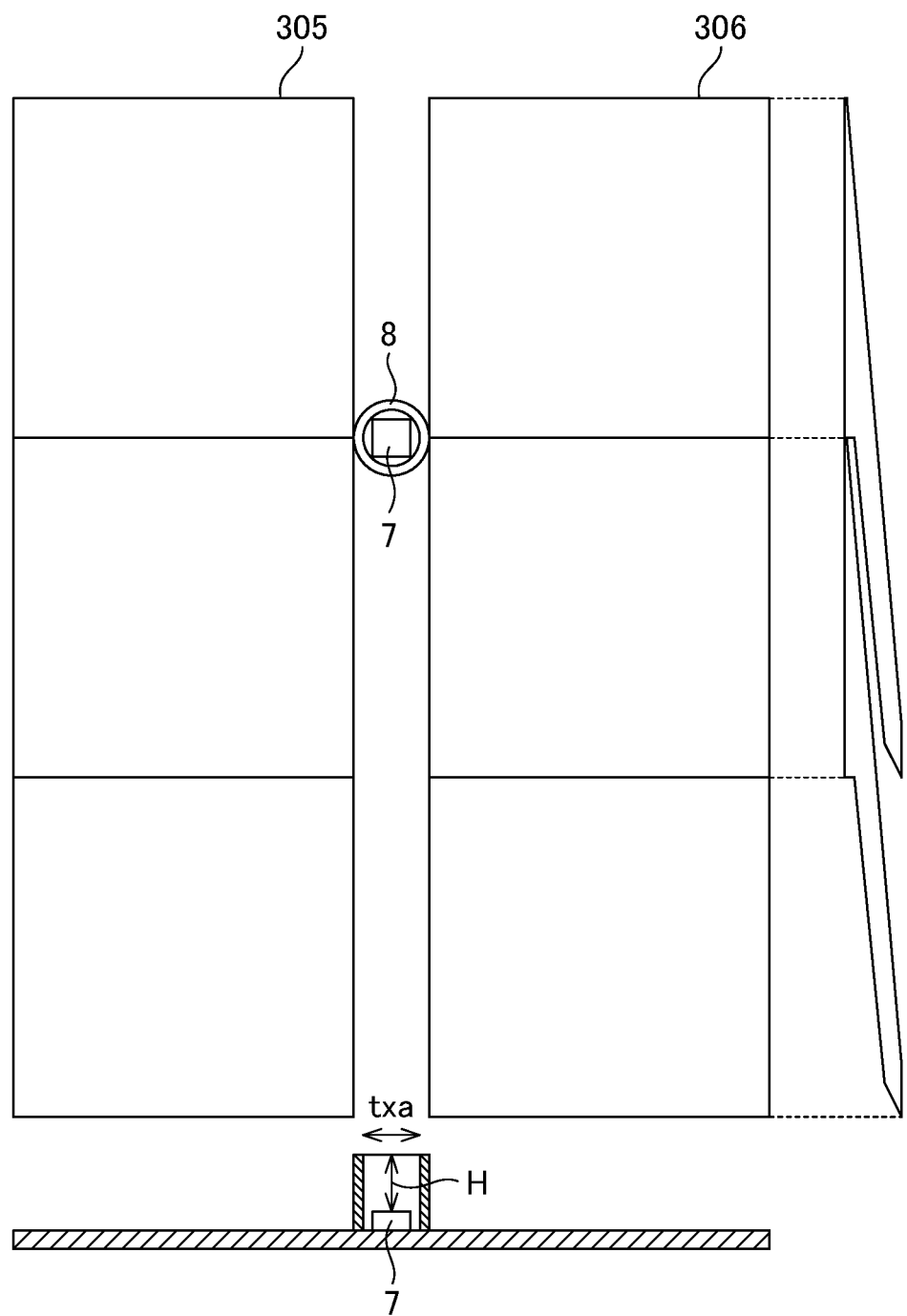
FIG. 8 is a front view illustrating an example of the arrangement of a plurality of light emitting units spaced apart from each other.

FIG. 8 is a front view illustrating an example in which a cylindrical member 8 is provided around the light sensor 7, a side view on the right side thereof, and a cross-sectional view on the lower side thereof. In this embodiment, a left-side light guide plate 305 and a right-side light guide plate 306 are spaced from each other by the distance "txa" so as to provide a gap therebetween. Then, the cylindrical member 8 is arranged around the light sensor 7 such that the distance H between the end of the cylindrical member 8 and the light sensor 7 is equal to the width "txa" of the gap.

According to the second embodiment, the arrangement structure can be realized such that the light guide unit and the light source of the light emitting unit located at the end do not extend outside the light emission region of the backlight device by the combination of the multiple types of light guide plates.

Third Embodiment

Next, a description will be given of a third embodiment of the present invention. In the present embodiment, a description will be given of the configuration in which the reflection surface 3 shown in FIG. 1 is eliminated by arranging LEDs in the lateral direction of the light guide plate so as to launch light into the light guide unit.

Figure 9:
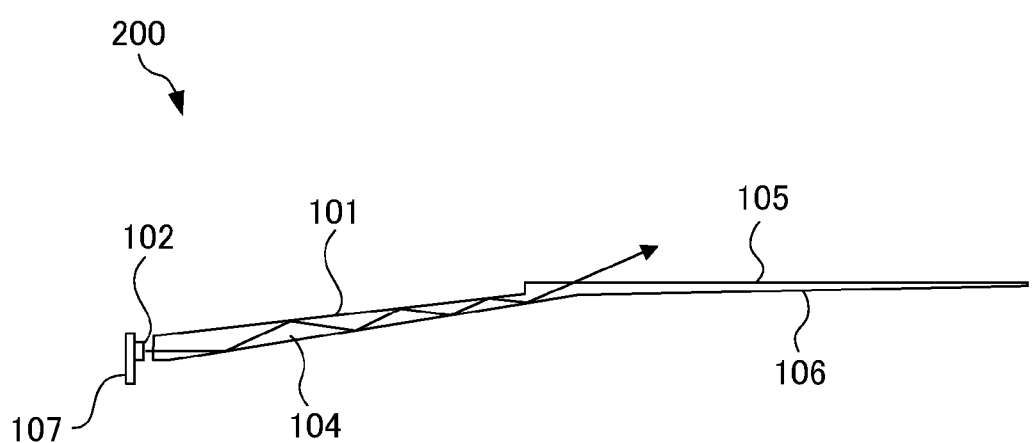
FIG. 9 is a cross-sectional view illustrating an example of the configuration of a light emitting unit according to a third embodiment of the present invention in conjunction with FIGS. 10A to 13.

FIG. 9 is a cross-sectional view illustrating a light emitting unit 200 of the present embodiment.

A plurality of LEDs 102 (only one of them is shown in FIG. 9) serving as light sources is arranged at the left end of the light guide plate 101. The LED 102 is mounted on a LED substrate 107, and light emitted from the LED 102 enters from the left side surface of the light guide plate 101. Light entering the light guide plate 101 is repeatedly reflected within the light guide unit 104, and then guided to the distal end of the light guide unit 104 to thereby exit to the outside through the light emission surface 105. In order to uniform a light-emission distribution over the light emission surface 105, a diffusing/reflecting surface 106 formed by a white dot is printed on the back surface of the light emission surface 105.

Next, a description will be given of a method for arranging a plurality of light guide plates in combination. In the following description, four light emitting units are orthogonal to each other. In this case, there are two types of combination. The first type of arrangement is that four light guide plates are combined in a counterclockwise direction as viewed from the front (hereinafter referred to as "counterclockwise arrangement") and the second type of arrangement is that four light guide plates are combined in a clockwise direction as viewed from the front (hereinafter referred to as "clockwise arrangement"). In the present embodiment, an assembly consisting of light emitting units combined in the counterclockwise arrangement is a first group and an assembly consisting of light emitting units combined in the clockwise arrangement is a second group, and both the first group and the second group are used in combination. Although the details of which will be described below, LEDs can be efficiently mounted, resulting in a reduction in manufacturing costs.

Figure 10A:
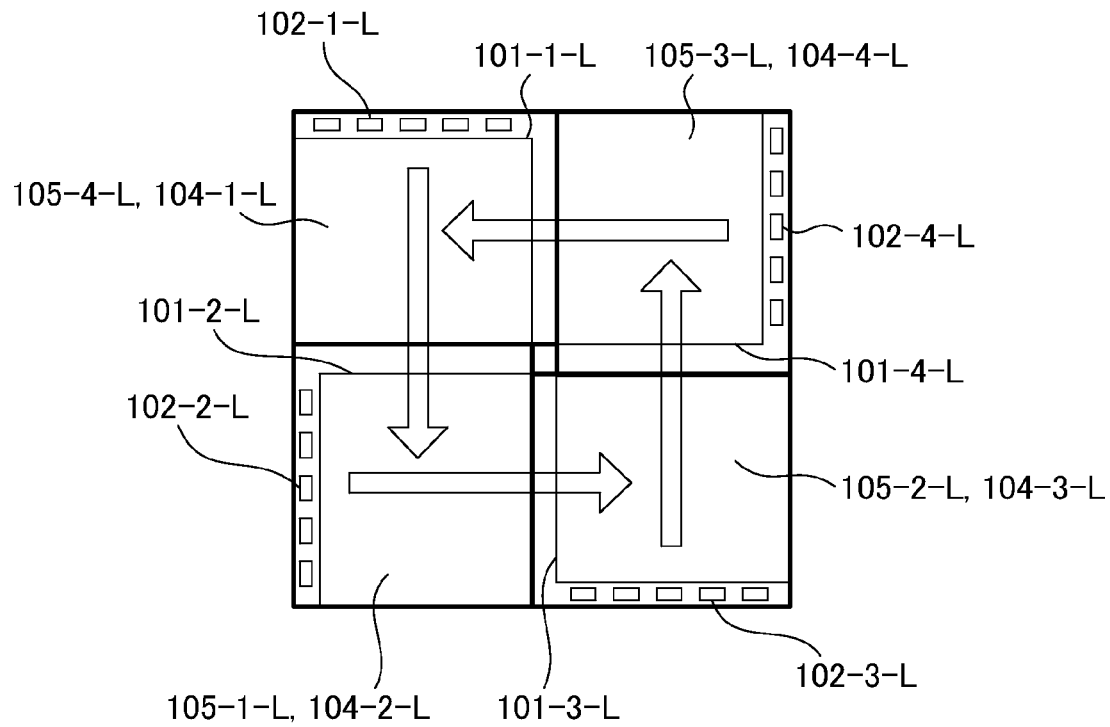
FIG. 10A is a front view illustrating four light emitting units are arranged orthogonal to each other in a counterclockwise direction.
Figure 10B:
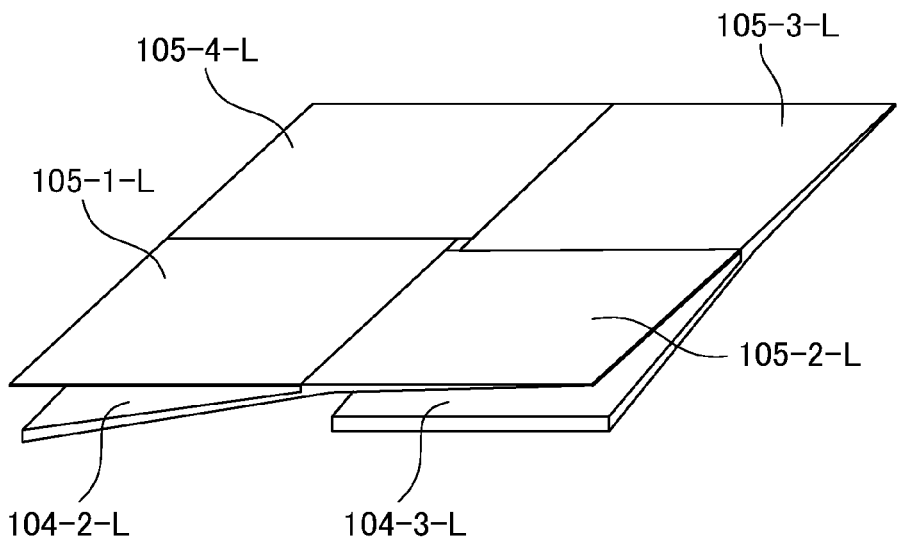
FIG. 10B is a perspective view illustrating four light emitting units are arranged orthogonal to each other in a counterclockwise direction.

Firstly, a description will be given of the combination of light emitting units in the counterclockwise arrangement. FIG. 10A is a front view illustrating four light emitting units are arranged orthogonal to each other in a counterclockwise direction and FIG. 10B is a perspective view illustrating four light emitting units are arranged orthogonal to each other in a counterclockwise direction.

When the natural number variable N is in a range from 1 to 4, a light guide plate 101-N-L has a light guide unit 104-N-L and a light emission surface 105-N-L, and forms a light emitting unit together with a LED 102-N-L. "-L" is an index that explicitly represents the counterclockwise arrangement. The relationship between the adjacent light guide unit 104-N-L and the light emission surface 105-N-L is the same as that in FIG. 2 according to the first embodiment.

The arrows shown in FIG. 10A indicates the direction along which light emitted from the LED 102-N-L is guided. Light emitted from the LED 102-N-L exits to the outside from the light emission surface 105-N-L through the light guide unit 104-N-L. It can be seen that four arrows are oriented in the counterclockwise direction as viewed from the front. Four light emitting units are arranged orthogonal to each other in the counterclockwise direction, and thus, the light guide unit 104-N-L overlaps with a light emission surface 105-(N−1)-L (provided that when N−1=0, N−1=4).

Figure 11A:
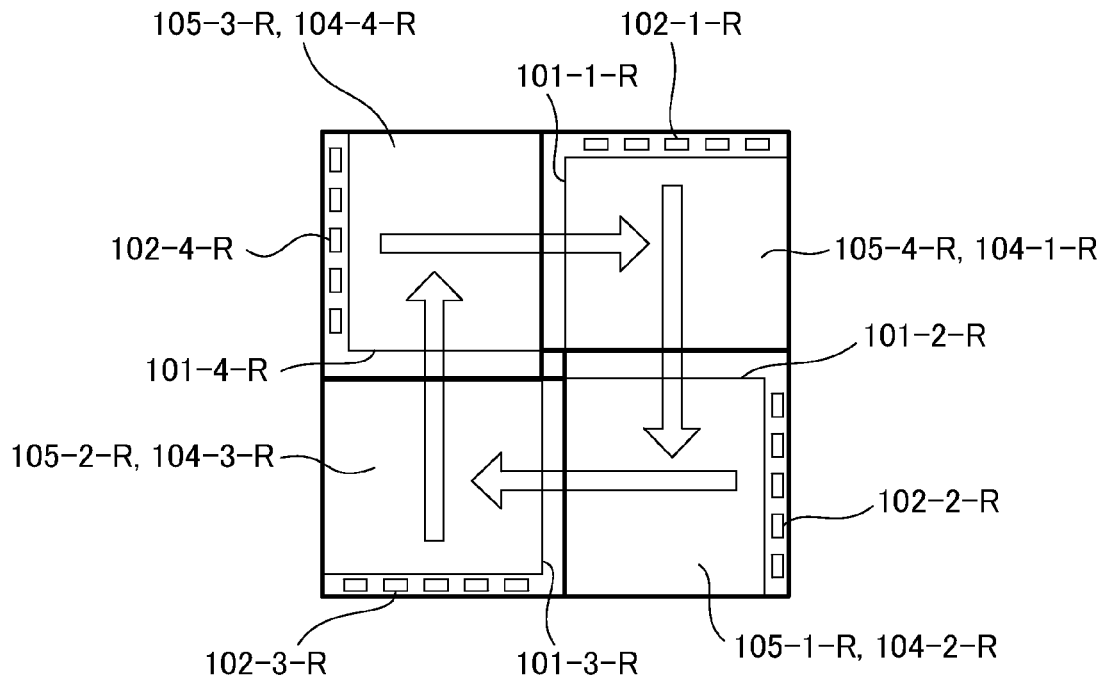
FIG. 11A is a front view illustrating four light emitting units are arranged orthogonal to each other in a clockwise direction.
Figure 11B:
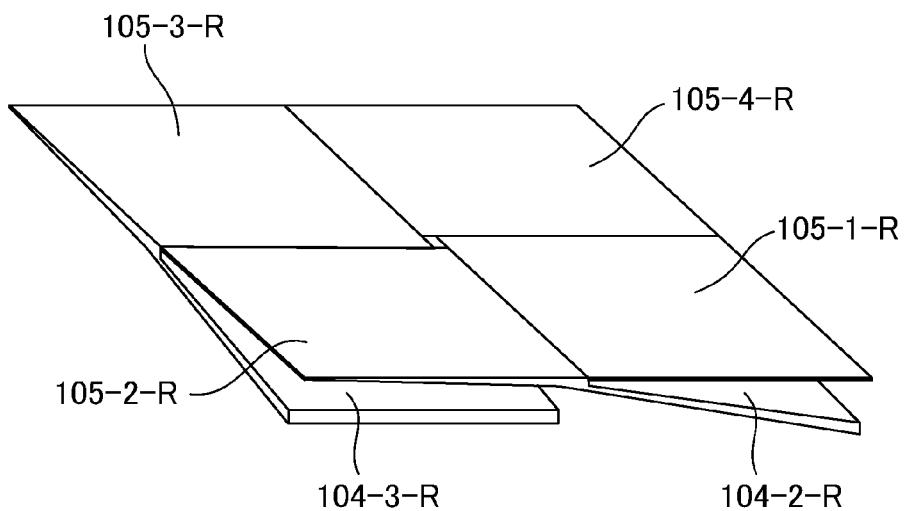
FIG. 11B is a perspective view illustrating four light emitting units are arranged orthogonal to each other in a clockwise direction.

Next, a description will be given of the combination of light emitting units in the counterclockwise arrangement. FIG. 11A is a front view illustrating four light emitting units are arranged orthogonal to each other in a clockwise direction and FIG. 11B is a perspective view illustrating four light emitting units are arranged orthogonal to each other in a clockwise direction.

Four light emitting units are arranged orthogonal to each other in the clockwise direction. A light guide plate 101-N-R has a light guide unit 104-N-R and a light emission surface 105-N-R, and forms a light emitting unit together with an LED 102-N-R. "-R" is an index that explicitly represents the clockwise arrangement. As can be seen from the arrows shown in FIG. 11A, the direction along which light emitted from the LED 102 is guided is opposite to the direction shown in FIG. 10A. Also, the light guide unit 104-N-R overlaps with the light emission surface 105-(N−1)-R, and both are overlapped in a direction opposite to the direction shown in FIG. 10A.

Figure 12A:
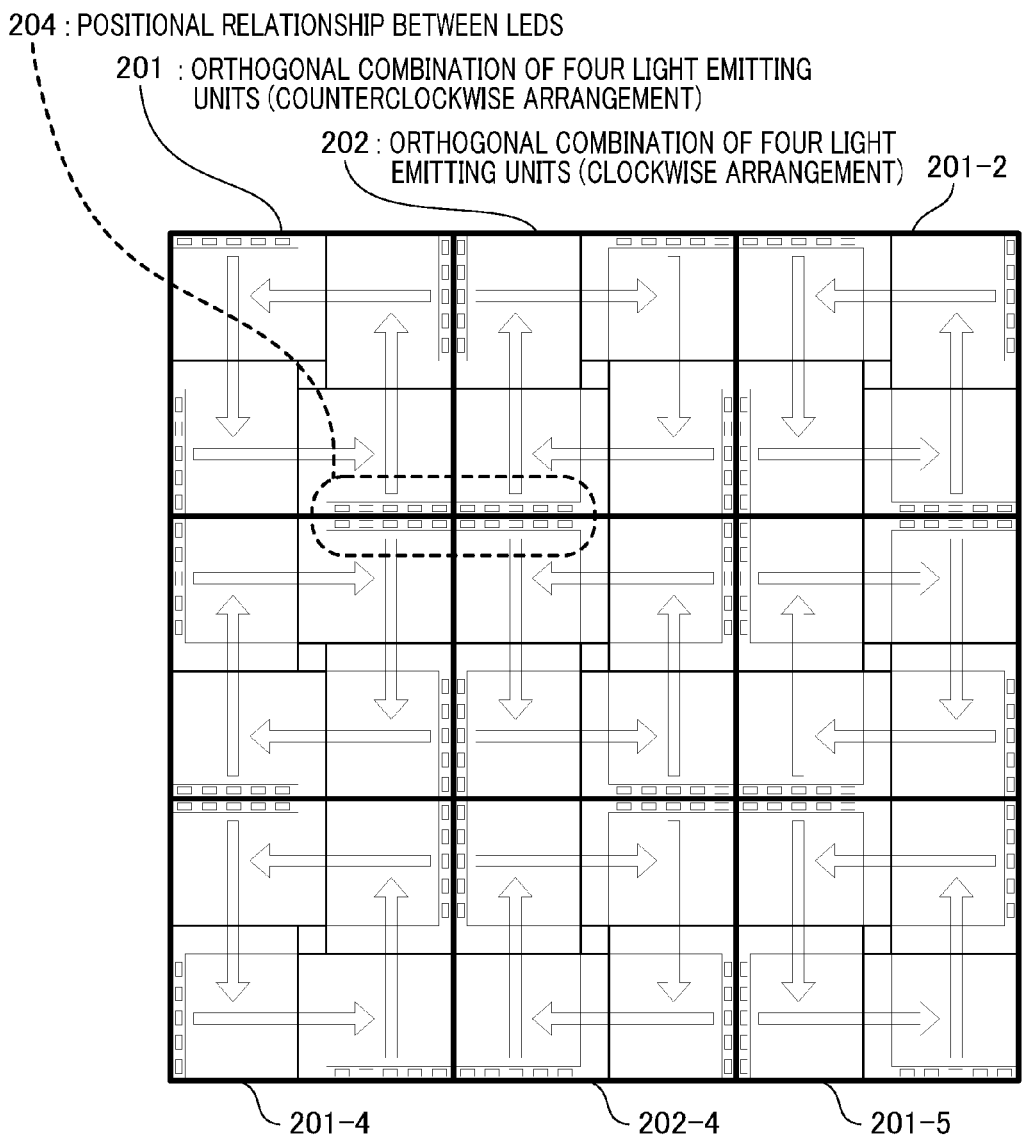
FIG. 12A is a front view illustrating an example of the combined assemblies in which a group of light emitting units arranged in a counterclockwise direction and a group of light emitting units arranged in a clockwise direction are alternately arranged to each other.

FIG. 12A is a front view illustrating an example of the configuration of the entire backlight in which the counterclockwise arrangement of five assemblies and the clockwise arrangement of four assemblies are alternately arranged to each other as viewed from the front. These are alternately arranged on the same plane. The clockwise arrangement of assemblies 202-1 to 202-4 are arranged adjacent the periphery of the counterclockwise arrangement of assemblies 201-1 to 201-5.

Figure 14A:
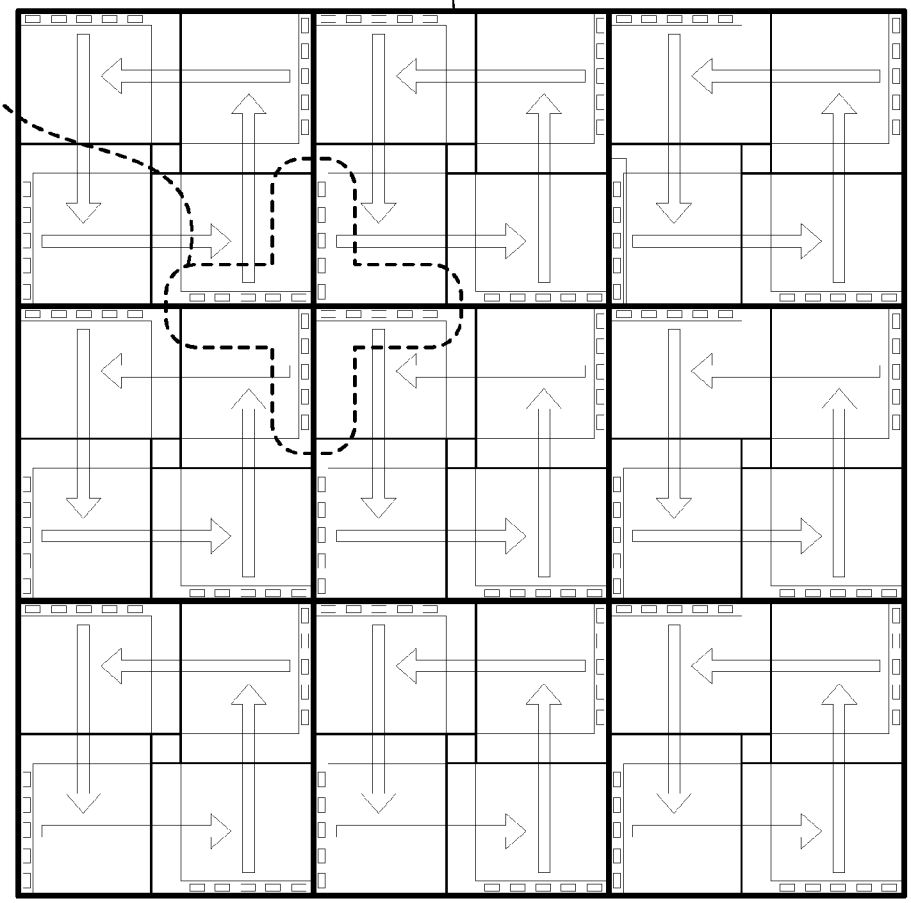
FIG. 14A is a front view illustrating an example of the combined assemblies in which only a group of light emitting units arranged in a counterclockwise direction is used.
Figure 14B:
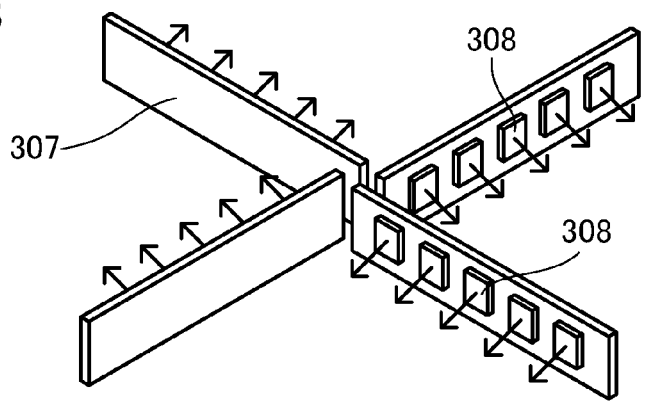
FIG. 14B is a view illustrating light source units.

As a reference example, FIG. 14A shows an exemplary configuration of the entire backlight consisting only of the counterclockwise arrangement of the assemblies 201. As can be seen from the positional relationship 203 between LEDs, the LED portions of each light emitting unit are arranged in cross-shape as viewed from the front, the light emitting directions are in four different directions of up, down, left, and right in FIG. 14A. FIG. 14B is a perspective view illustrating the positional relationship between LED portions arranged in cross-shape. The LEDs 308 of each light emitting unit are mounted on LED substrates 307, and the light emitting directions are different from each other as shown by the arrows. Thus, the LED substrates 307 must be configured by a plurality of components.

Figure 12B:
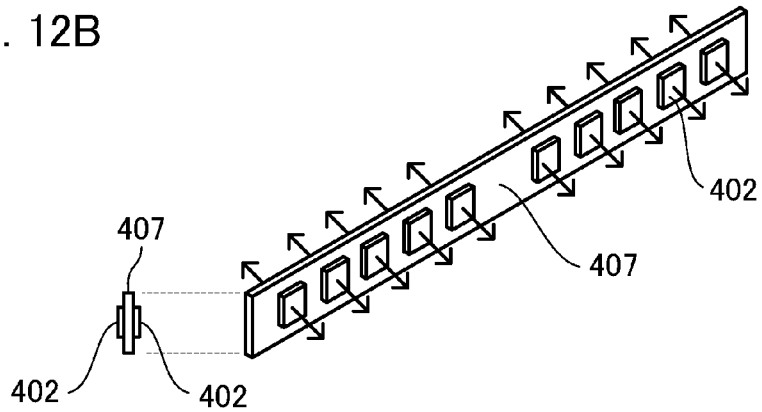
FIG. 12B is a view illustrating light source units.

In contrast, in the configuration shown in FIG. 12A, LEDs of each light emitting unit are arranged along a straight line and these light emitting directions are unified in two directions as can be seen from a range 204 indicating the positional relationship between LED portions. FIG. 12B is a side view illustrating the structure of LED portions on the left side and a perspective view illustrating the structure of LED portions on the right side. A plurality of LEDs 402 are linearly arranged on the front and back surfaces of an LED substrate 407 along a fixed direction. Both the light emitting direction of LEDs constituting a first light source and the light emitting direction of LEDs constituting a second light source are in a direction perpendicular to the LED substrate 407 and are opposite to each other. Thus, LEDs 402 can be mounted on both surfaces of one LED substrate 407, resulting in a reduction in manufacturing costs.

Figure 13A:
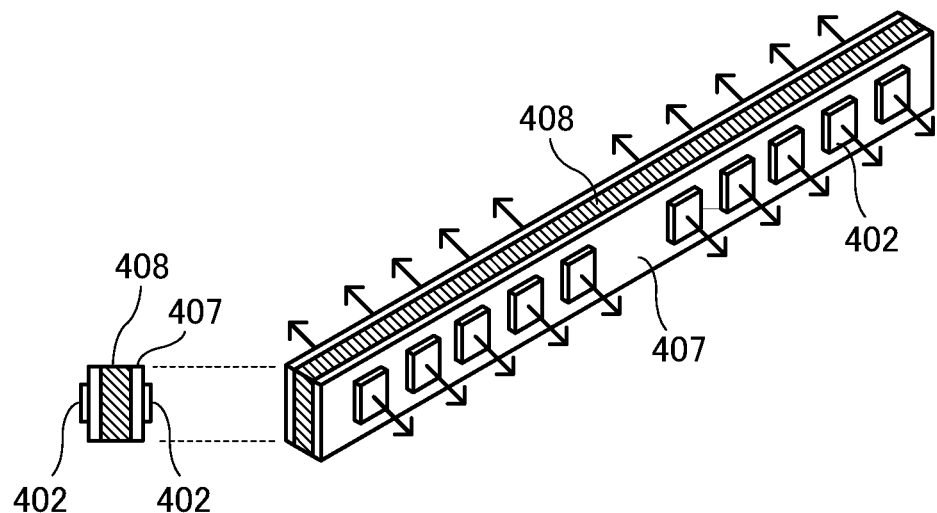
FIG. 13A is a view illustrating an exemplary configuration in which a heat sink is sandwiched by two substrates on which light sources are mounted.
Figure 13B:
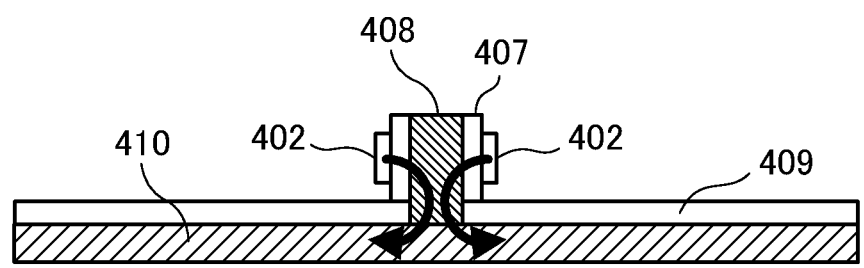
FIG. 13B is a cross-sectional view illustrating an exemplary configuration in which a heat sink is sandwiched by two substrates on which light sources are mounted.

FIG. 13 is a view illustrating an exemplary configuration in which a heat sink 408 as a heat conductive member is sandwiched by two LED substrates 407, i.e., one substrate on which the first light source is mounted and the other substrate on which the second light source is mounted, to as to improve heat radiation characteristic of the LEDs 402. FIG. 13A shows a side view of the configuration on the left side and a perspective view of the configuration on the right side, where the light emitting direction of the LEDs 402 are shown by arrows. FIG. 13B is a schematic cross-sectional view illustrating the LED portions, a base substrate 409, and a base heat sink 410. As shown by the arrows, heat from the LEDs 402 is transferred to the heat sink 408 sandwiched by the LED substrates 407 and then transferred to the base heat sink 410, resulting in an increase in heat-dissipation efficiency.

According to the third embodiment, the same effects as those derived from the first embodiment may be provided. Furthermore, a backlight device is configured by using a group of the light emitting units arranged in a counterclockwise direction and a group of the light emitting units arranged in a clockwise arrangement in combination, which simplifies the structure of light source units.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-104550 filed on May 9, 2011, which is hereby incorporated by reference herein in its entirety.

What is claimed is:

1. A light emitting device in which a plurality of light emitting units each having a light source and a light guide plate are combined,
    wherein each light guide plate has a light guide unit that guides light from the light source and a light emission surface that emits light from the light guide unit,
    wherein each light emitting unit is arranged to cross another light emitting unit such that no light guide unit extends outside the light emitting device, and
    wherein each light guide unit of each light guide plate overlaps with a light emission surface of a light guide plate constituting another light emitting unit.

2. The light emitting device according to claim 1, wherein the plurality of light emitting units each using a light guide plate are arranged orthogonal to each other as viewed from the direction perpendicular to the light emission surface of the light guide plate.

3. The light emitting device according to claim 1, comprising:
    a plurality of light emitting units that is arranged along a fixed direction; and
    a direction-changing light emitting unit that is provided for changing an orientation of the arrangement of the plurality of light emitting units,
    wherein the light guide unit of the light guide plate constituting a light emitting unit positioned at the end among the plurality of light emitting units overlaps with the light emission surface of the light guide plate constituting the direction-changing light emitting unit which is arranged to be orthogonal to the light emitting unit.

4. The light emitting device according to claim 3, wherein a level difference section is formed at a space between the light guide unit of the light guide plate constituting a light emitting unit positioned at the end among the plurality of light emitting units, and the portion having the light emission surface, and the height of the level difference section is equal to or greater than the thickness of the portion having the light emission surface of the light guide plate constituting the direction-changing light emitting unit.

5. The light emitting device according to claim 2, comprising:
    a first group consisting of four of the light emitting units which are arranged orthogonal to each other in a counterclockwise direction as viewed from the direction perpendicular to the light emission surface of the light guide plate; and
    a second group consisting of four of the light emitting units which are arranged orthogonal to each other in a clockwise direction as viewed from the direction perpendicular to the light emission surface of the light guide plate,
    wherein the second group are arranged around the first group.

6. The light emitting device according to claim 5, further comprising:
    a substrate for mounting a first light source constituting a light emitting unit of the first group and a second light source constituting a light emitting unit of the second group,
    wherein a light emitting direction of the first light source is opposite to a light emitting direction of the second light source.

7. The light emitting device according to claim 6, wherein a heat conduction member is provided between a substrate on which the first light source is mounted and a substrate on which the second light source is mounted.

8. The light emitting device according to claim 1, further comprising:
    a light detection unit configured to detect the light emitted from the light guide plate constituting the light emitting unit,
    wherein the light detection unit detects the light coming from a hole portion surrounded by the light emission surfaces of light guide plates in a group in which the plurality of light emitting units is arranged or a notch formed in the light guide plate as viewed from the direction perpendicular to the light emission surface of the light guide plate.

9. The light emitting device according to claim 8, wherein the size of the hole portion or the notch is equal to the distance from the light detection unit to the light emission surface of the light guide plate.

10. A display apparatus comprising:
    the light emitting device according to claim 1; and
    a display unit configured to display an image using light from the light emitting device.

* * * * *